No. 888,436. PATENTED MAY 19, 1908.
R. D. GALLAGHER, Jr.
DRAFT AND BUFFING RIGGING.
APPLICATION FILED JAN. 6, 1904.
2 SHEETS—SHEET 1.
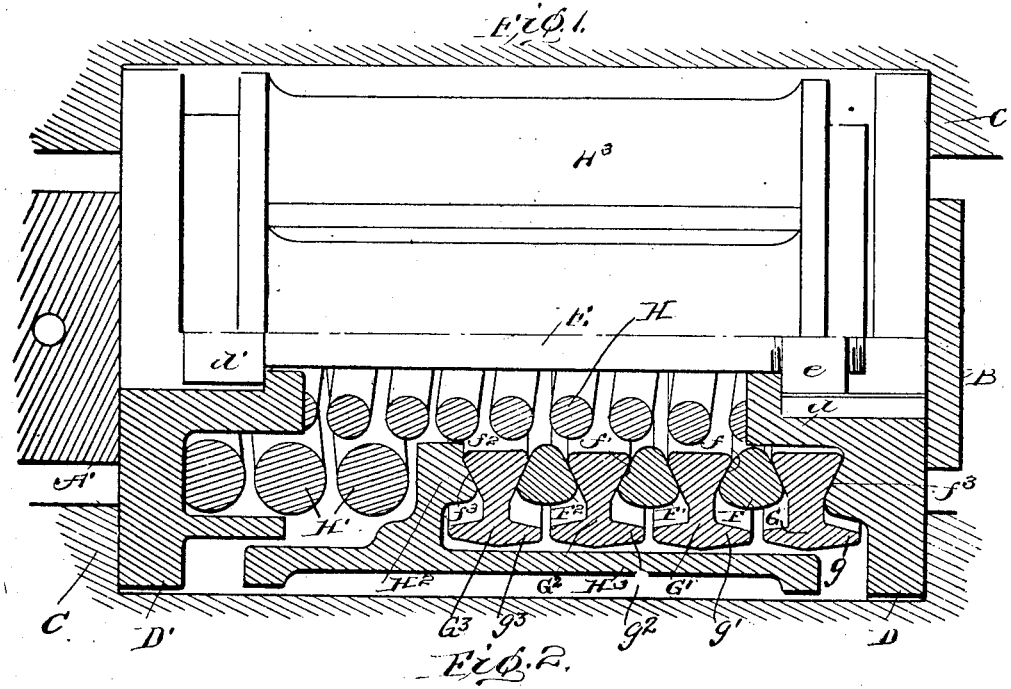
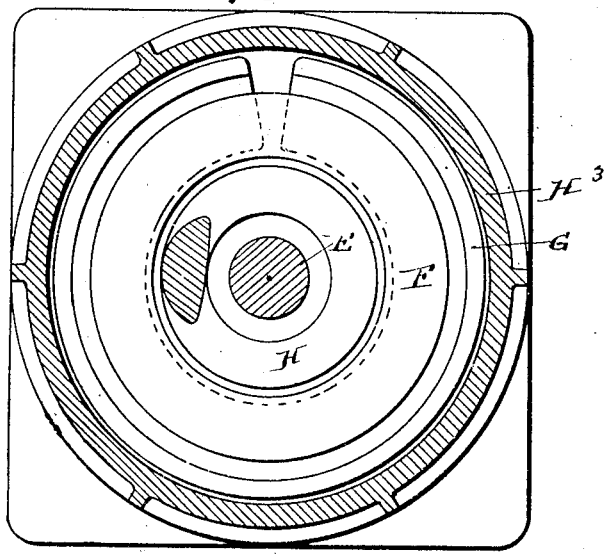
Witnesses
J. N. Fowler Jr.
Thomas Durant
Inventor
Richard D. Gallagher Jr.
By Church & Church
his Attorneys No. 888,436. PATENTED MAY 19, 1908.
R. D. GALLAGHER, Jr.
DRAFT AND BUFFING RIGGING.
APPLICATION FILED JAN. 6, 1904.
2 SHEETS—SHEET 2.
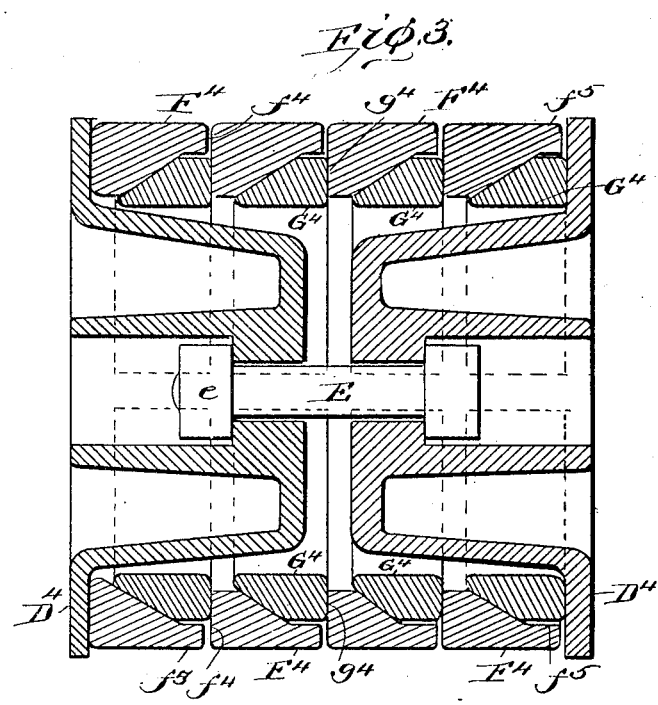

UNITED STATES PATENT OFFICE.

RICHARD D. GALLAGHER, JR., OF NEW YORK, N. Y., ASSIGNOR TO STANDARD COUPLER COMPANY, OF NEW YORK, N. Y., A CORPORATION OF NEW JERSEY.

DRAFT AND BUFFING RIGGING.

No. 888,436.   Specification of Letters Patent.   Patented May 19, 1908.

Original application filed November 22, 1902, Serial No. 132,432. Divided and this application filed January 6, 1904. Serial No. 187,977.

*To all whom it may concern:*

Be it known that I, RICHARD D. GALLAGHER, Jr., of New York, in the county and State of New York, have invented certain new and useful Improvements in Draft and Buffing Rigging; and I do hereby declare the following to be a full, clear, and exact description of the same, reference being had to the accompanying drawings, forming a part of this specification, and to the figures and letters of reference marked thereon.

This application is a division of my prior application Serial No. 132,432, Series of 1900, filed November 22, 1902, and like the invention contained in said prior application this invention relates to improvements in draft and buffing rigging for railway cars, although features of the invention are applicable to any mechanism employed for the purpose of yieldingly resisting the relative movements of parts.

The object of the invention is to provide a structure having elasticity so modified by friction that the elastic resistance to compressive strains is vastly augmented and the recoil reduced to a minimum, which structure shall be self contained and the friction created by the direct action of the elastic member or members, thereby avoiding the necessity of employing separate elastic and friction members.

The invention of the present division relates more particularly to the construction and assemblage of the elastic and friction members and consists essentially of a series of elastic friction members interposed between a series of substantially corresponding but inelastic friction members, both of said series of members having inclined friction faces, the said friction faces being inclined both to the plane of elasticity and to the line of pressure, whereby upon the application of pressure the elastic elements will, through the action of the inclined friction faces, be put under strains transversely of the line of pressure, the friction above the inclined faces augmenting the resistance of the elastic members in one direction and resisting the recoil movements of the elastic elements in the opposite direction.

The invention further consists in certain novel details of construction and combinations and arrangements of parts all as will be now described and pointed out particularly in the appended claims.

Referring to the accompanying drawings—Figure 1 is a sectional elevation of a device embodying the present improvements and Fig. 2 is a transverse section of the structure illustrated in Fig. 1. Fig. 3 is a cross section showing a slightly different form of friction elements.

Like letters of reference in the several figures indicate the same parts.

In the application of the invention to draft and buffing rigging of railway cars, ordinary appliances are employed for transmitting the draft and buffing strains thereto, such, for instance, as the draw bar and tail strap A' and B of the accompanying drawings and for which any other preferred and well known devices may be substituted.

The pressure resisting member itself may be held between stops of usual character located on the draft timbers as illustrated conventionally at C in said drawings, the said pressure resisting member being thus substituted in the position of the usual draft and buffing springs.

D and D' indicate end followers which are preferably rectangular as shown in Fig. 2, and which are adapted to be located between the stops C and to be surrounded by the draw bar yoke or tail strap. The inner surfaces of the followers D and D' are provided with inwardly projecting portions $d$ and $d'$ preferably hollow and circular in form. A bolt E extends through alined openings concentrically formed in the portions $d$ and $d'$ of the followers and is retained in position by a nut $e$, the head of the bolt and nut $e$ lying within the recesses formed in the heads $d$ and $d'$ respectively and in such position as to prevent injurious contact with the draw bar or tail strap as will be readily understood.

Interposed between the followers are a series of abutting pairs of frictional elements, each pair composed of a resilient and an adjoining non-resilient member having coöperating frictional surfaces; F F' F² indicating the non-resilient members and G G' G² G³ indicating the resilient members. Inwardly inclined peripheral friction surfaces $f$ $f'$ $f^2$ are formed upon the non-resilient members F F' F², said surfaces coöperating with corresponding surfaces on the adjoining resilient members G G' G² G³, respectively.

In the particular embodiment of the invention illustrated in Figs. 1 and 2 the friction elements are shown associated with ordinary springs, one of said springs H being arranged centrally within the friction members and extending between the heads D D' while the other of said springs H' is arranged at one end of the friction members and is confined between head D' and a spacer H² which is interposed between the said spring and friction element, the spacer H² thus forming a supplemental head or follower, and in order to give additional protection against the entry of dirt a casing H³ is mounted on the intermediate head H² and extends around both the springs and friction members.

The heads between which the friction members are confined, are preferably provided with inclined friction surfaces $f^3$, corresponding to the inclined friction surfaces on the friction members and thus in effect constitute non-resilient elements of the combination. In order to limit the compressive movements, alternate members of said friction elements are preferably provided with flanged outer peripheries which flanges, lettered $g, g', g^2, g^3$, Fig. 1 of the accompanying drawings, will abut or come in contact with each other when the device is subjected to strain, and the flanges of the members or elements adjacent the heads will contact with the heads. The limit of movement is therefore determined by the spaces between the flanges on the friction elements and as a consequence the extent of movement may be controlled so as to prevent undue strain in the elastic elements.

In some instances, it may be desirable to form the rings in pairs, the rings of each pair operating upon each other to produce lateral expansion or contraction of the rings and to provide friction surfaces between the pairs which will be operative to create friction when such expansion or contraction takes place, but without any tendency to cause such movements. In Fig. 3 the cross sectional shape of the rings is so modified as to effect this, as well as to secure increased strength by an advantageous disposition of the material in the rings. The pairs of rings are indicated by the letters F⁴ and G⁴ the rings F⁴ being non-resilient and the rings G⁴ resilient. Said rings have annular inclined contacting or coöperating friction faces as before and substantially parallel or radial side faces $f^4$ and $g^4$, the latter faces in no wise tending to deflect the rings, but relative transverse movements of the rings cause said faces to slide upon each other and produce friction in proportion to the pressure forcing said faces into contact. The heads D⁴ in this instance also have radial friction faces corresponding to the radial friction faces of the rings and constitute inelastic elements in the combination. In this latter instance, as in the former, alternate elements of the combination are provided with flanges $f^5$ which serve to limit the compression of the elements and consequently prevent the elastic elements from being strained beyond their elastic limit.

It is obvious that the resisting capacity of the assembled apparatus may be increased or diminished by varying the thickness or strength of the elastic members or rings or by varying the inclination of the engaged frictional surfaces.

While I have described more or less precisely the details of construction I do not wish to be understood as limiting myself thereto, as I contemplate changes in form, the proportion of parts and the substitution of equivalents as circumstances may suggest or render expedient without departing from the spirit of my invention.

Having thus described my invention, what I claim as new and desire to secure by Letters Patent, is:—

1. A frictional device comprising a series of abutting pairs of frictional elements, each pair composed of a resilient and a non-resilient member, said members alternating with each other and having coöperating frictional faces.

2. A frictional device comprising a series of abutting pairs of frictional elements, each pair composed of a resilient and a non-resilient member, said members having coöperating inclined frictional faces.

3. A frictional device comprising a series of abutting pairs of frictional elements, each pair composed of a resilient and a non-resilient member, and the coöperating faces of the members being alternately inclined and radial.

4. In an apparatus of the character described, the combination with a series of annular members comprising yielding members and having complemental inclined friction faces, and the yielding members of which series are put under transverse elastic stress by the coöperation of the inclined faces, of flanges on alternate members adapted to abut and limit the range of elastic movement; substantially as described.

5. In an apparatus of the character described, an annular friction element having a peripheral flange for limiting the range of elastic movement; substantially as described.

RICHARD D. GALLAGHER, Jr.

Witnesses:
A. HAMILTON COOKE,
THOMAS DURANT.